US012775428B2

(12) United States Patent
Hanayama

(10) Patent No.: US 12,775,428 B2
(45) Date of Patent: Oct. 27, 2026

(54) IMAGE FORMING APPARATUS CONFIGURED TO USE REAL-TIME CLOCK TO DETERMINE WHETHER TO DISABLE FUNCTIONS AND CONTROL METHOD OF IMAGE FORMING APPARATUS

(71) Applicant: BROTHER KOGYO KABUSHIKI KAISHA, Nagoya (JP)

(72) Inventor: Yukiyoshi Hanayama, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 193 days.

(21) Appl. No.: 18/425,841

(22) Filed: Jan. 29, 2024

(65) Prior Publication Data

US 2024/0303015 A1 Sep. 12, 2024

(30) Foreign Application Priority Data

Mar. 8, 2023 (JP) ................................ 2023-035994

(51) Int. Cl.
*G06F 3/12* (2006.01)

(52) U.S. Cl.
CPC .......... *G06F 3/1239* (2013.01); *G06F 3/1204* (2013.01); *G06F 3/1285* (2013.01)

(58) Field of Classification Search
CPC ..... G06F 3/1239; G06F 3/1204; G06F 3/1285
See application file for complete search history.

(56) References Cited

U.S. PATENT DOCUMENTS 5,752,128 A * 5/1998 Yamashita ............. G03G 21/02 399/80
2009/0323107 A1* 12/2009 Maeda ................... G03G 15/50 358/1.15
2014/0340702 A1* 11/2014 Maki .................... H04N 1/4413 358/1.14
2021/0303234 A1* 9/2021 Fukusada .............. G06F 3/1285
2022/0035292 A1 2/2022 Kishimoto
2022/0174179 A1* 6/2022 Yamada ................ G06F 3/1203
(Continued)

FOREIGN PATENT DOCUMENTS

JP 2022-25457 A 2/2022
WO 2014/120199 A1 8/2014

*Primary Examiner* — Nicholas Pachol
(74) *Attorney, Agent, or Firm* — Merchant & Gould P.C.

(57) ABSTRACT

A controller performs: acquiring payment deadline information from a server via a communication interface, and storing the payment deadline information in a memory, the payment deadline information including a payment deadline of a contract fee for an image forming apparatus that is usable by setting a contract; determining whether communication with the server is possible; in response to determining that communication with the server is not possible, determining whether a real-time clock is operating; in response to determining that the real-time clock is operating, acquiring time information from the real-time clock and determining whether the time information is past the payment deadline by referring to the payment deadline information stored in the memory and the time information acquired from the real-time clock; and in response to determining that the time information is past the payment deadline, disabling at least part of functions of the image forming apparatus.

18 Claims, 6 Drawing Sheets

(56) References Cited

U.S. PATENT DOCUMENTS

| | | | | |
|---|---|---|---|---|
| 2023/0182481 | A1* | 6/2023 | Shioiri | B41J 2/2103 347/43 |
| 2024/0031501 | A1* | 1/2024 | Suzuki | H04N 1/00514 |
| 2024/0176562 | A1* | 5/2024 | Saito | G06F 3/1239 |
| 2024/0256810 | A1* | 8/2024 | Arakaki | H04N 1/00925 |
| 2024/0281911 | A1* | 8/2024 | Terae | G06F 3/1239 |

* cited by examiner

FIG. 6

| NO. | 1 | 2 | 3 | 4 | 5 | 6 | 7 | 8 |
|---|---|---|---|---|---|---|---|---|
| COMMUNICATION WITH SERVER | NOT POSSIBLE | NOT POSSIBLE | NOT POSSIBLE | NOT POSSIBLE | POSSIBLE | POSSIBLE | POSSIBLE | POSSIBLE |
| RTC OPERATION FLAG | OFF | OFF | ON | ON | OFF | OFF | ON | ON |
| PAYMENT FLAG | OFF | ON | OFF | ON | OFF | ON | OFF | ON |
| INTERFACE LOCK DETERMINATION | UNUSABLE | UNUSABLE | UNUSABLE | USABLE | UNUSABLE | USABLE | UNUSABLE | USABLE |

IMAGE FORMING APPARATUS CONFIGURED TO USE REAL-TIME CLOCK TO DETERMINE WHETHER TO DISABLE FUNCTIONS AND CONTROL METHOD OF IMAGE FORMING APPARATUS

REFERENCE TO RELATED APPLICATIONS

This application claims priority from Japanese Patent Application No. 2023-035994 filed on Mar. 8, 2023. The entire content of the priority application is incorporated herein by reference.

BACKGROUND ART

In recent years, a flat-rate printing service has been widely provided to users who use image forming apparatuses. The flat-rate printing service is also called a subscription service. For example, in an image forming apparatus which is a contract apparatus for which a contract for use of a flat-rate printing service is set, printing is permitted at a fixed usage fee for a particular period of time up to a preset number of sheets.

SUMMARY

In such a subscription service, there is a contract for an image forming apparatus having a plurality of functions such as a printing function, a scan function, a fax transmission function, and a fax reception function. In a case where an apparatus contract for the image forming apparatus is set, there is a demand for restricting functions that are usable by the image forming apparatus when the image forming apparatus is used in an unauthorized manner, for example, when a contract fee is not paid. However, when the image forming apparatus is offline, that is, when the image forming apparatus is disconnected from an external server, it is difficult to determine whether the image forming apparatus is used in an unauthorized manner.

In view of the foregoing, an example of an object of this disclosure is to provide an image forming apparatus configured to determine an unauthorized use even in an offline state where communication with an external server is disconnected.

According to one aspect, this specification discloses an image forming apparatus. The image forming apparatus includes a communication interface, a memory, a real-time clock, and a controller. The controller is configured to perform: acquiring payment deadline information from a server via the communication interface, and storing the payment deadline information in the memory. The payment deadline information includes a payment deadline of a contract fee for the image forming apparatus that is usable by setting a contract. Thus, the image forming apparatus acquires the payment deadline information. The controller is configured to perform: determining whether communication with the server is possible. Thus, the image forming apparatus determines whether communication with the server is possible. The controller is configured to perform: in response to determining that communication with the server is not possible, determining whether the real-time clock is operating. Thus, the image forming apparatus determines whether the real-time clock is operating. The controller is configured to perform: in response to determining that the real-time clock is operating, acquiring time information from the real-time clock and determining whether the time information is past the payment deadline by referring to the payment deadline information stored in the memory and the time information acquired from the real-time clock. Thus, the image forming apparatus acquires the time information from the real-time clock and determines whether the time information is past the payment deadline. The controller is configured to perform: in response to determining that the time information is past the payment deadline, disabling at least part of functions of the image forming apparatus. Thus, the image forming apparatus disables at least part of functions of the image forming apparatus. According to another aspect, this specification also discloses a control method of the image forming apparatus described above.

According to the image forming apparatus or the control method of the image forming apparatus of the above aspects, in a case where communication with the server is not possible, when it is determined that the real-time clock is operating, the time information is acquired from the real-time clock. When the time information acquired from the real-time clock is past the payment deadline of the contract fee, at least part of functions usable by the image forming apparatus is made unusable. This makes it possible to restrict the functions that are usable by the image forming apparatus when the payment deadline of the contract fee has passed during an offline state where communication with the external server is disconnected. Thus, it is possible to provide an image forming apparatus configured to determine an unauthorized use even in the offline state where communication with the external server is disconnected.

In addition to the image forming apparatus and the control method of the image forming apparatus, the technology disclosed in the present specification may be realized in various aspects, and may be realized in the form of, for example, a computer program for realizing the functions of the method or apparatus, a storage medium (for example, a non-transitory storage medium) in which the computer program is stored, and so on.

BRIEF DESCRIPTION OF DRAWINGS

FIG. 6 is a table for explaining an example of use states where some functions of the multifunction peripheral are unusable.

DESCRIPTION

Embodiment 1

Hereinafter, Embodiment 1 of the present disclosure will be described with reference to FIGS. 1 to 6. In the present embodiment, as an example, an image forming apparatus is a so-called multifunction printer or multifunction peripheral (MFP) having a plurality of functions including a printing function, a scanner function, and a facsimile transmission and reception function. In this example, the printing function is configured by a laser printer.

[Overview of Image Forming System]

Figure 1:
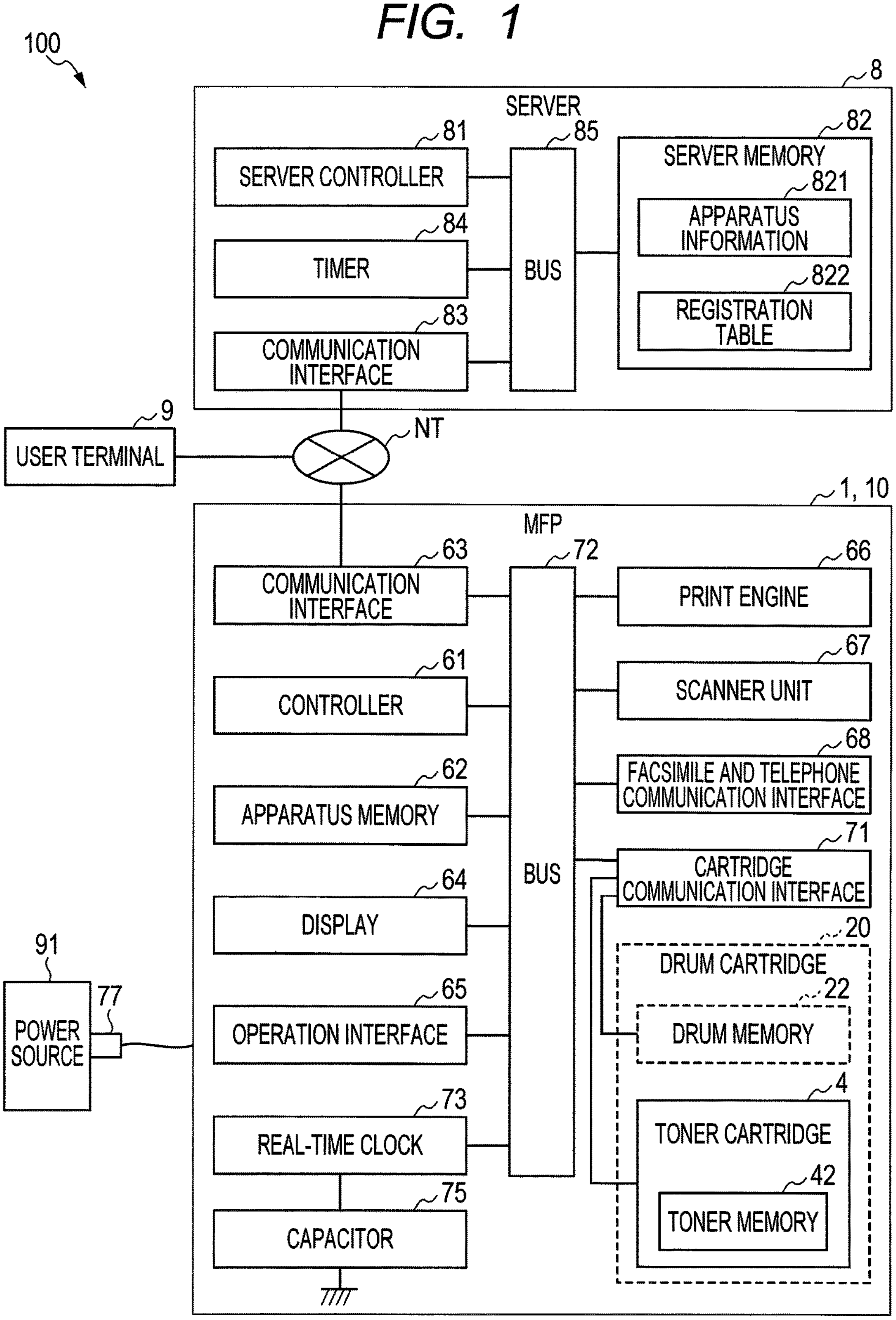
FIG. 1 is a block diagram showing an overall schematic configuration of an image forming system.

FIG. 1 is a block diagram showing an overall schematic configuration of an image forming system 100 of the present embodiment. As shown in FIG. 1, the image forming system 100 includes an MFP 1, a server 8, and a user terminal 9.

The MFP 1 is an apparatus for realizing a service provided by setting a contract such as an "apparatus contract" or a "consumable contract" described later with respect to the MFP 1. The MFP 1 can also be said to be an apparatus that is a contract target. Hereinafter, the contract-target MFP 1 which is designated by a user or provided to a user from a business operator is also referred to as a "contract target apparatus".

For example, the user sets an "apparatus contract" which is an example of a "contract" with the business operator. With this contract, the user is provided with a service that allows the user to use a contract-dedicated apparatus main body 10 provided by the business operator at a fixed rate every month, for example. Thus, when the user sets the "apparatus contract" with the business operator, the ownership of the MFP 1 belongs to the business operator. When the user purchases the MFP 1 and does not set the "apparatus contract" with the business operator, the ownership of the MFP 1 belongs to the user.

For example, the user sets a "consumable contract", which is an example of a "contract", with the business operator. This allows the user to use a contract-dedicated consumable dedicated to the contract at a fixed rate every month, for example. Setting these contracts mean that a business operator providing a service and a user agree that the business operator provides the service in a state where a service use period, a service use fee (also referred to as contract fee), and so on are arranged between the business operator and the user.

That is, after the "consumable contract" is set, the MFP 1 of the present embodiment performs printing using a contract-dedicated consumable (hereinafter, also referred to as "contract printing") based on the content of the set contract.

In the MFP 1 of the present embodiment, after the "apparatus contract" is set, the user is allowed to use the contract-dedicated apparatus main body 10 based on the content of the set contract. That is, after the "apparatus contract" is set, the user is allowed to use the MFP 1 for which the contract is set.

When a user sets the "apparatus contract", the user may also set the "consumable contract" at the same time. By setting the "apparatus contract" and the "consumable contract", the user is allowed to perform contract printing using the contract-dedicated consumable by the MFP 1 that is the contract-dedicated apparatus main body 10.

[User Terminal 9]

The user terminal 9 used by the user is an apparatus for performing the setting and cancellation of a contract and other procedures by communicating with the server 8. As the user terminal 9, for example, an information processing terminal having a standard communication function, such as a personal computer (PC) or a smartphone, may be employed. The user may instruct the MFP 1 to print via the user terminal 9, and may print a desired number of sheets using the contract-dedicated consumable. The user terminal 9, the server 8, and the MFP 1 constituting the image forming system 100 communicate with one another via a network NT such as the Internet.

The user terminal 9 includes an input interface for receiving various input operations of the user and a communication interface for communicating with the server 8. The user registers the contract target apparatus of the "consumable contract" in the server 8 by performing an input operation via the user terminal 9. For example, the user inputs, to the user terminal 9, his or her own identification information and identification information of the MFP 1 to be the contract target apparatus of the "consumable contract". In response to receiving the input, the user terminal 9 transmits the input information to the server 8.

[Server 8]

The server 8 is an external apparatus that communicates with the MFP 1 via the network NT, and is an example of a management apparatus that manages the operation state of the MFP 1. In the present embodiment, the server 8 is a server managed by the business operator. As shown in FIG. 1, the server 8 includes a server controller 81, a server memory 82, a communication interface 83, and a timer 84. The server controller 81, the server memory 82, the communication interface 83, and the timer 84 are connected to one another via a bus 85. The server controller 81 is a central processing unit (CPU) that performs overall control of the server 8. The server memory 82 is a storage device that stores data necessary for the operation of the server 8.

The server controller 81 updates a registration table stored in the server memory 82 in response to a notification or a request received from the MFP 1. The "registration table" is a data table in which an apparatus ID for identifying the MFP 1 designated as the contract target apparatus, a user name, and a user ID for identifying the user are registered (stored) in association with one another. The registration is performed by the user or the server 8. That is, the registration table includes information that associates the user with the MFP 1 that is the contract target apparatus. The "registration table" is also data indicating whether each contract target apparatus is currently under contract.

The server memory 82 includes an area 821 and an area 822. The server memory 82 stores the apparatus information in the area 821. The server memory 82 stores the registration table in the area 822. The areas 821 and 822 are rewritable areas. The apparatus information is data in which various kinds of information related to the MFP 1 are collected. The apparatus information is stored separately for each of the MFPs 1. The apparatus information includes at least the apparatus ID for identifying the MFP 1. The apparatus information may further include the cumulative number of printed matters printed by the MFP 1, the cumulative number of printed matters printed by the MFP 1 in the contract printing, the contract period of the apparatus contract, the contract fee of the apparatus contract, the payment deadline of the contract fee, information on whether the contract fee is paid, and so on in association with the apparatus ID.

The communication interface 83 is a wired interface or a wireless interface for communicating with the user terminal 9 and the MFP 1, and is connected to the network NT. The server controller 81 receives various data, notifications, and requests from the MFP 1 via the communication interface 83. The server controller 81 transmits various data, notifications, and requests to the MFP 1 via the communication interface 83.

For example, the server controller 81 receives the apparatus ID, the cumulative number of printed matters, and the cumulative number of printed matters printed in the contract printing from the MFP 1 via the communication interface 83. Then, the server controller 81 may store the received apparatus ID and the respective cumulative numbers in the area 821 of the server memory 82 as the apparatus information of the MFP 1 in association with one another.

[MFP 1]

As shown in FIG. 1, the MFP 1 includes a controller 61, an apparatus memory 62, a communication interface 63, a display 64, an operation interface 65, a print engine 66, a scanner unit 67, a facsimile and telephone communication interface 68, a cartridge communication interface 71, a real-time clock 73, and a capacitor 75. The controller 61, the apparatus memory 62, the communication interface 63, the display 64, the operation interface 65, the print engine 66, the scanner unit 67, the facsimile and telephone communication interface 68, the cartridge communication interface 71, and the real-time clock 73 are connected to one another via a bus 72. The apparatus main body 10 is connected to a power source 91 via a power supply plug 77.

In the MFP 1, in a state where the toner cartridge 4 is attached to the drum cartridge 20, the toner cartridge 4, together with the drum cartridge 20, is detachably attached to the apparatus main body 10. The drum cartridge 20 includes a photosensitive drum (not shown) as a component used for image formation. The drum cartridge 20 may include a drum memory 22. The drum memory 22 is a memory from which information is read and to which information is written. The drum memory 22 is, for example, a flash ROM (Read Only Memory) or an EEPROM (Electronically Erasable and Programmable Read Only Memory).

The drum memory 22 may store information relating to the photosensitive drum of the drum cartridge 20. The drum memory 22 may store a drum ID. The drum memory 22 may store drum life information. The drum ID is a unique serial number for identifying each drum cartridge 20. The drum life information is information indicating the life of the photosensitive drum.

The toner cartridge 4 includes a toner memory 42 as an example of a consumable memory. The toner memory 42 is disposed on an outer surface of the toner cartridge 4. The toner memory 42 is a memory from which information is read and to which information is written, and is, for example, a flash ROM or an EEPROM.

The toner memory 42 stores information relating to the toner cartridge 4. For example, the toner memory 42 stores a toner ID, second type information, and toner remaining amount information.

The toner ID is, for example, a unique serial number for identifying each toner cartridge 4. The toner ID may include information indicating the color of each toner cartridge 4.

The second type information is information representing the type of the toner cartridge 4. In the present embodiment, there are two types of the toner cartridge 4. One is a "contract-dedicated cartridge" as an example of a contract-dedicated consumable that is usable only in the contract target apparatus (i.e., that is unusable in apparatuses other than the contract target apparatus). The other is a "normal cartridge" as an example of a normal consumable that is also usable in the MFP 1 that is not the contract target apparatus. The second type information may be included in the toner ID. That is, the toner ID may be information for identifying each toner cartridge 4 and information indicating the type of each toner cartridge 4.

The toner remaining amount information is information indicating the toner remaining amount in the toner cartridge 4. The toner remaining amount includes values corresponding to a plurality of stages from full to empty, for example. The value corresponding to the toner remaining amount among the plurality of stages from full to empty is stored as the toner remaining amount. Each level of the toner remaining amount stored in the toner memory 42 may be a character string such as "FULL" to "EMPTY", a numerical value such as "100%" to "0%", or information obtained by combining a character string and a numerical value, based on the above-described values.

The cartridge communication interface 71 is, for example, a terminal. The cartridge communication interface 71 is electrically connected to each of the drum memory 22 of the drum cartridge 20 attached to the apparatus main body 10 and the toner memory 42 of the toner cartridge 4 attached to the apparatus main body 10 together with the drum cartridge 20.

The controller 61 includes, for example, an ASIC (Application Specific Integrated Circuit). The controller 61 executes various processes to enable the use of a plurality of functions including a printing function, a scanner function, and a facsimile transmission and reception function of the MFP 1.

The controller 61 may include a processor such as a CPU. In this case, the apparatus memory 62 may store a control program for realizing a plurality of functions including the printing function, the scanner function, and the facsimile transmission and reception function. The processor of the controller 61 may operate in accordance with the control program stored in the apparatus memory 62, thereby realizing the use of a plurality of functions including the printing function, the scanner function, and the facsimile transmission and reception function in the MFP 1.

The controller 61 itself may include a computer-readable storage medium storing the control program. As the storage medium, a "non-transitory tangible medium", for example, a tape, a disk, a card, a semiconductor memory, a programmable logic circuit, and so on may be used in addition to a ROM (Read Only Memory) and so on. Alternatively, a RAM (random access memory) and so on for expanding the control program may be used.

The control program may be supplied to the computer via any transmission medium (a communication network, a broadcast wave, and so on) that transmits the control program. Note that one aspect of the present disclosure may also be realized in the form of a data signal embedded in a carrier wave in which the control program is embodied by electronic transmission.

When the drum cartridge 20 and the toner cartridge 4 are attached to the apparatus main body 10, the drum memory 22 and the toner memory 42 are electrically connected to the controller 61 via the cartridge communication interface 71. The controller 61 becomes ready to execute a process of reading information from the drum memory 22 and the toner memory 42 via the cartridge communication interface 71. The controller 61 also becomes ready to execute at least a writing process or a rewriting process of information to the drum memory 22 and the toner memory 42 via the cartridge communication interface 71.

Figure 2:
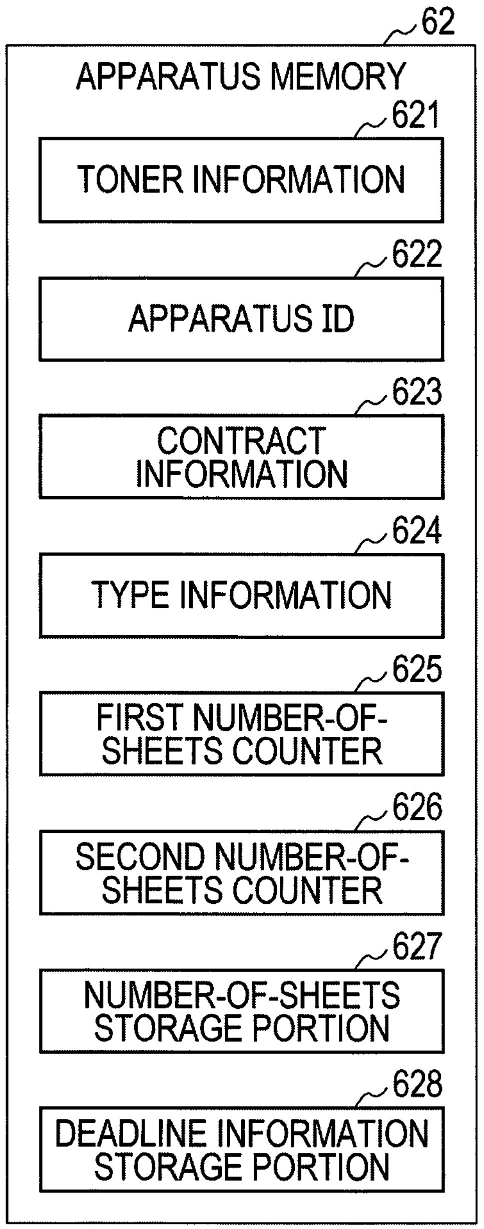
FIG. 2 is a block diagram showing an example of information stored in an apparatus memory.

The apparatus memory 62 is a memory from which information is read and to which information is written. The apparatus memory 62 is, for example, a flash ROM or an EEPROM. As shown in FIG. 2, the apparatus memory 62 has areas 621, 622, 623, 624, 625, 626, 627 and 628 for storing various information. The apparatus memory 62 stores toner information in the area 621.

The toner information is information relating to each toner cartridge 4 attached to the MFP 1. For example, the toner information may be data in which the toner ID read from a certain toner memory 42 is associated with the second type information and the toner remaining amount information read from the same toner memory 42. The apparatus memory 62 may store the data associated in this way in the area 621 for each toner cartridge 4.

The apparatus memory 62 stores the apparatus ID in the area 622. The apparatus ID is identification information for identifying the MFP 1. The apparatus ID may be, for example, a serial number of the MFP 1.

The apparatus memory 62 stores contract information in the area 623. The contract information is assumed to be one of two types of modes, "contract mode" and "normal mode". The "contract mode" indicates a state where a "consumable contract" for the MFP 1 is set. The "normal mode" indicates a state where the "consumable contract" for the MFP 1 is not set or the "consumable contract" has been cancelled. When the MFP 1 is shipped from the factory, a value corresponding to the "normal mode" is stored in the area 623 as an initial value. The controller 61 rewrites the "contract information" as appropriate.

The apparatus memory 62 stores type information in the area 624. The type information is information indicating the type of the MFP 1. In the present embodiment, there are two types of the MFP 1. One is a "contract-dedicated apparatus" as an example of a contract-dedicated apparatus that is usable when the "apparatus contract" is set. The other is a "normal apparatus" as an example of a normal apparatus that is not under the "apparatus contract" or is usable regardless of whether the "apparatus contract" is set.

The controller 61 rewrites the type information as appropriate. When the MFP 1 is shipped from the factory, a value corresponding to "normal apparatus" is stored as an initial value in the area 624. The type information may be included in the apparatus ID. That is, the apparatus ID may include information for identifying each MFP 1 and information indicating the type of each MFP 1.

The apparatus memory 62 stores a first number-of-sheets counter in the area 625. The first number-of-sheets counter is a cumulative total of the number of printed sheets in the MFP 1. The apparatus memory 62 stores a second number-of-sheets counter in the area 626. The second number-of-sheets counter indicates the number of sheets of the printed matter printed by the MFP 1 in the contract printing. The second number-of-sheets counter may be reset to 0 each time the MFP 1 shifts from the contract mode to the normal mode, or may be the cumulative total of printed sheets printed by the MFP 1 based on the contract. Hereinafter, unless otherwise specified, the value of the second number-of-sheets counter is the cumulative total of the number of printed sheets printed in the contract printing or the number of printable sheets.

The apparatus memory 62 includes a number-of-sheets storage portion in the area 627. The number-of-sheets storage portion stores the number of sheets of printed matter that is printable by the MFP 1 in the contract printing. The apparatus memory 62 includes a deadline information storage portion in the area 628. The deadline information storage portion stores deadline information including the contract start date and time, the contract end date and time, and the payment deadline of the contract fee for each of the "consumable contract" and the "apparatus contract".

As shown in FIG. 1, the communication interface 63 is a wired interface or a wireless interface for communicating with the user terminal 9 and the server 8, and is connected to the network NT. The communication interface 63 is also connected to a telephone network. The controller 61 receives various data, notifications, and requests from the server 8 and so on via the communication interface 63. The controller 61 transmits various data, notifications, and requests to the server 8 via the communication interface 63.

The display 64 is, for example, a liquid crystal display. The operation interface 65 is a device that receives an operation by a user. The user inputs various instructions to the MFP 1 by operating the operation interface 65. The operation interface 65 may be configured by a touch panel integrally arranged on the screen of the display 64.

The print engine 66 takes out and conveys a sheet in a sheet feeding tray by a conveyance mechanism (not shown). The print engine 66 prints an image on the conveyed sheet by a laser printer method using the drum cartridge 20 and the toner cartridge 4. Thus, the MFP 1 has a printing function that uses the print engine 66. The toner cartridges 4 include the toner cartridges 4 for cyan, magenta, yellow, and black. However, hereinafter, unless otherwise specified, they are simply referred to as "toner cartridges 4" without being distinguished from one another.

The scanner unit 67 optically reads a document which is a reading target by using a photoelectric conversion element such as a CCD or a CMOS. Thereafter, the MFP 1 generates scan data representing the image read by the scanner unit 67. Thus, the MFP 1 has a scanner function that uses the scanner unit 67.

The facsimile and telephone communication interface 68 is connected to the telephone network via the communication interface 63. The facsimile and telephone communication interface 68 transmits and receives image data as a facsimile signal to and from an external communication destination apparatus, and performs voice communication with a desired call destination. Thus, the MFP 1 has a facsimile transmission function and a facsimile reception function.

The real-time clock (RTC) 73 is an electric circuit that measures time, and has a function as an internal clock. The real-time clock 73 is driven by a driving power supplied from a power supply circuit (not shown). When the power supply plug 77 of the apparatus main body 10 is removed from the power source 91 and the power supply to the apparatus main body 10 is stopped, the real-time clock 73 is supplied with driving power from the capacitor 75 instead of the power supply circuit (not shown). The driving power from the capacitor 75 is supplied for a particular period depending on the capacitance of the capacitor 75. The particular period is approximately two weeks, for example.

The controller 61 refers to current time information measured by the real-time clock 73. The controller 61 acquires current time information from the server 8 via the communication interface 63 and update the time of the real-time clock 73 to the current time information.

[Apparatus Contract Management Process]

Figure 3:
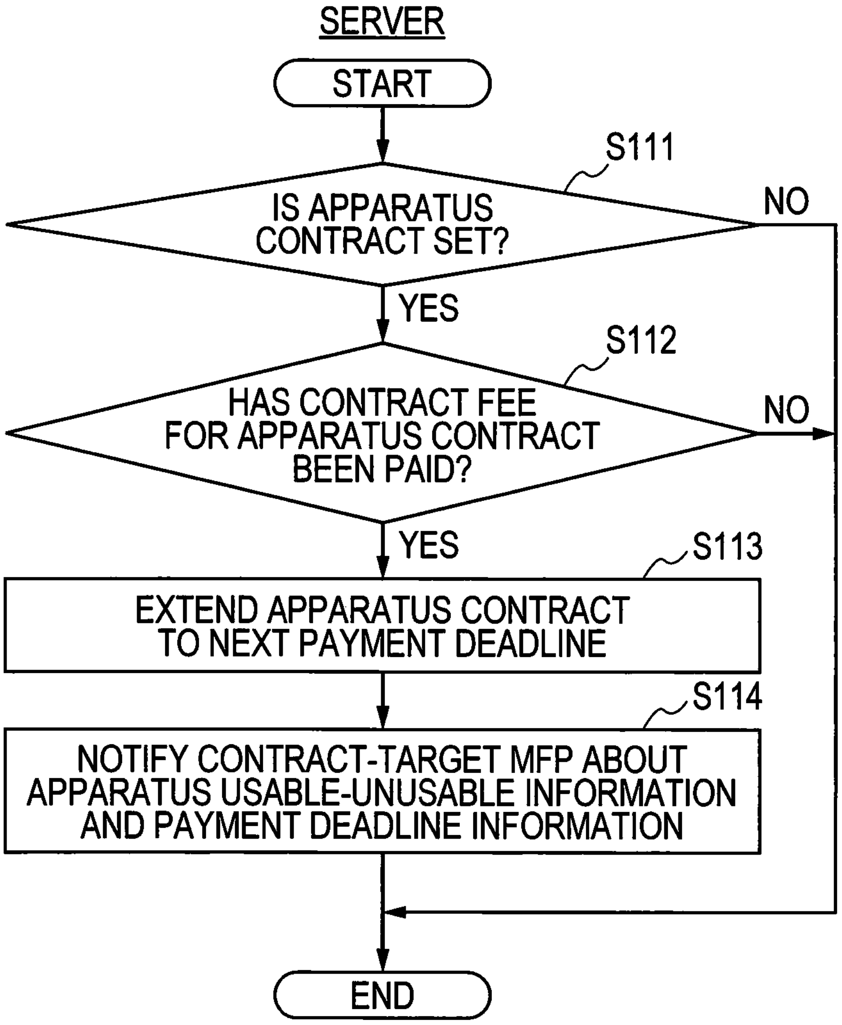
FIG. 3 is a flowchart showing an example of an apparatus contract management process executed by a server.

Next, an apparatus contract management process for managing a setting status of an apparatus contract for the MFP 1 will be described with reference to FIG. 3. FIG. 3 is a flowchart showing an example of the apparatus contract management process executed by the server 8. The program shown in the flowchart of FIG. 3 is stored in advance in the server memory 82. The server controller 81 starts the program of the apparatus contract management process every several minutes to several hours, and proceeds to step S111. Hereinafter, "step" will be abbreviated as "S".

As shown in FIG. 3, in S111, the server controller 81 determines whether the apparatus contract with the MFP 1 is set. Specifically, the server controller 81 determines whether the apparatus ID for identifying the MFP 1 as the contract target apparatus is stored in the registration table stored in the area 822 of the server memory 82. In response to determining that the apparatus contract with the MFP 1 is not set, that is, in response to determining that the apparatus ID for identifying the MFP 1 as the contract target apparatus is not stored in the registration table (S111: NO), the server controller 81 ends the apparatus contract management process.

In response to determining that the apparatus contract with the MFP 1 is set, that is, in response to determining that the apparatus ID for identifying the MFP 1 as the contract target apparatus is stored in the registration table (S111: YES), the server controller 81 proceeds to S112. In S112, the server controller 81 determines whether a contract fee of the apparatus contract of the MFP 1 for which the apparatus contract is set has been paid. Specifically, the server controller 81 reads out, from the registration table, the apparatus ID for identifying the MFP 1 with which the apparatus contract is set. Subsequently, the server controller 81 reads out the information on whether the contract fee corresponding to the apparatus ID has been paid from the apparatus information stored in the area 821 of the server memory 82, and determines whether the contract fee has been paid.

In response to determining that the contract fee of the apparatus contract of the MFP 1 for which the apparatus contract is set has not been paid (S112: NO), the server controller 81 ends the apparatus contract management process. In response to determining that the contract fee of the apparatus contract of the MFP 1 for which the apparatus contract is set has been paid (S112: YES), the server controller 81 proceeds to S113.

In S113, the server controller 81 reads out, from the registration table, the apparatus ID for identifying the MFP 1 with which the apparatus contract is set. Subsequently, the server controller 81 extends "payment deadline of contract fee" corresponding to the apparatus ID among the apparatus information stored in the area 821 of the server memory 82 to "next payment deadline", and stores the extended payment deadline in the apparatus information of the area 821 again. Thereafter, the server controller 81 proceeds to S114.

In S114, the server controller 81 reads out, from the registration table, the apparatus ID for identifying the MFP 1 with which the apparatus contract is set. Subsequently, the server controller 81 transmits apparatus usable-unusable information and payment deadline information to the MFP 1 corresponding to the apparatus ID via the communication interface 83, and then ends the apparatus contract management process. The apparatus usable-unusable information includes information indicating whether the contract fee of the apparatus contract of the MFP 1 has been paid and thus the apparatus main body 10 is continuously usable, and the apparatus ID for identifying the MFP 1. The payment deadline information includes the next payment deadline of the contract fee, the contract fee, and the apparatus ID for identifying the MFP 1.

[Real-Time Clock Management Process]

Figure 4:
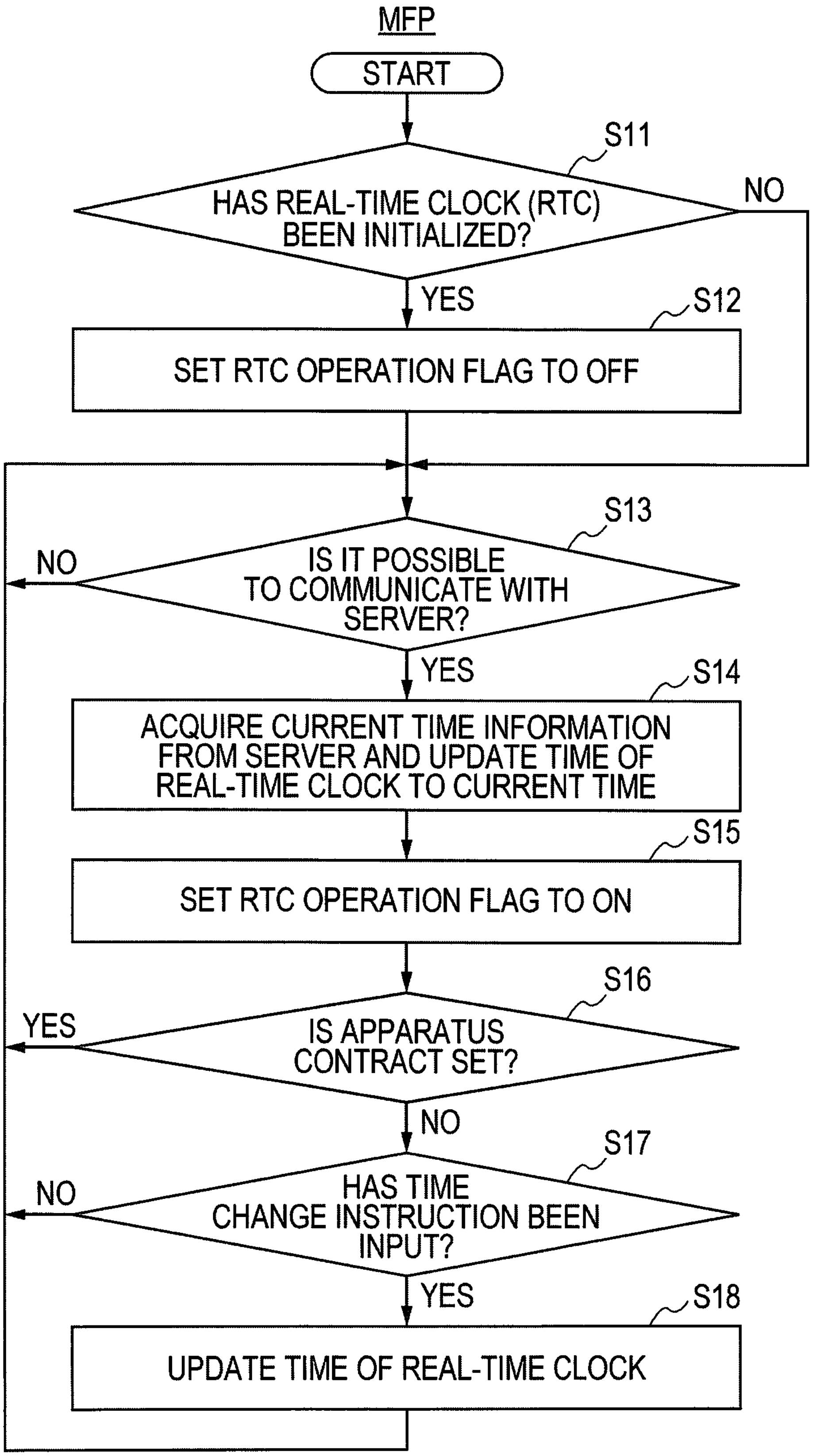
FIG. 4 is a flowchart showing an example of a real-time clock management process executed by a controller of a multifunction peripheral.

Next, a real-time clock management process for managing an operation state of the real-time clock 73 executed by the controller 61 of the MFP 1 will be described with reference to FIG. 4. FIG. 4 is a flowchart showing an example of the real-time clock management process executed by the controller 61 of the MFP 1. The program shown in the flowchart of FIG. 4 is stored in the apparatus memory 62 in advance. The controller 61 starts the program of the real-time clock management process when the MFP 1 starts the program. The controller 61 proceeds to S11 of the program shown in the flowchart of FIG. 4.

As shown in FIG. 4, in S11, the controller 61 communicates with a register of the real-time clock 73 to determine whether the real-time clock 73 has been initialized. That is, the controller 61 determines whether the capacitor 75 has run out of power and the real-time clock 73 has been initialized.

Here, the initialization of the real-time clock 73 will be described. The power supply to the apparatus main body 10 is stopped. Thereafter, the capacitor 75 for supplying driving power to the real-time clock 73 runs out of power. Thereafter, power is supplied again from the power source 91 to the real-time clock 73 via the power supply plug 77. In this case, the real-time clock 73 is initialized and restarted. When the real-time clock 73 has been initialized, the controller 61 communicates with the register of the real-time clock 73 and determines whether the real-time clock 73 has been initialized.

Then, in response to determining that the real-time clock 73 has not been initialized (S11: NO), the controller 61 proceeds to S13 described later. In response to determining that the real-time clock 73 has been initialized (S11: YES), the controller 61 proceeds to S12.

In S12, the controller 61 sets an RTC (real-time clock) operation flag to OFF. Specifically, the controller 61 reads the RTC operation flag from the apparatus memory 62. Then, since the current time information measured by the real-time clock 73 which has been initialized and restarted is not accurate time, the controller 61 sets the RTC operation flag to OFF, and proceeds to S13.

Here, the RTC operation flag will be described. The RTC operation flag is a flag indicating whether the current time information measured by the real-time clock 73 is accurate time. When the RTC operation flag is ON, it indicates that the current time information measured by the real-time clock 73 is accurate time. When the RTC operation flag is OFF, it indicates that the current time information measured by the real-time clock 73 is not accurate time.

In S13, the controller 61 determines whether it is possible to communicate with the server 8 via the communication interface 63.

In response to determining that it is not possible to communicate with the server 8 (S13: NO), the controller 61 executes S13 again. In response to determining that it is possible to communicate with the server 8 (S13: YES), the controller 61 proceeds to S14.

In S14, the controller 61 acquires current time information from the server 8 via the communication interface 63. Then, the controller 61 updates the time of the real-time clock 73 to the current time information acquired from the server 8, and then proceeds to S15. The current time information acquired from the server 8 and updated is an accurate time. The controller 61 may acquire the current time information from an SNTP (Simple Network Time Protocol) server on the network NT via the communication interface 63, instead of the server 8.

In S15, the controller 61 sets the RTC operation flag to ON and stores the RTC operation flag in the apparatus memory 62. Thereafter, the controller 61 proceeds to S16.

In S16, the controller 61 reads the type information stored in the area 624 of the apparatus memory 62, and determines whether the type information is "contract-dedicated apparatus", that is, whether "apparatus contract" is set.

In response to determining that the type information is "contract-dedicated apparatus", that is, the "apparatus contract" is set (S16: YES), the controller 61 executes the processing of S13 and thereafter again. In response to determining that the type information is "normal apparatus", that is, the "apparatus contract" is not set (S16: NO), the controller 61 proceeds to S17.

In S17, the controller 61 determines whether a time change instruction of the real-time clock 73 has been input via the operation interface 65. In response to determining that the time change instruction of the real-time clock 73 has not been input via the operation interface 65 (S17: NO), the controller 61 executes the processing of S13 and thereafter again. In response to determining that the time change instruction of the real-time clock 73 has been input via the operation interface 65 (S17: YES), the controller 61 proceeds to S18.

In S18, the controller 61 updates the time of the real-time clock 73 to the time information acquired via the operation interface 65. Thereafter, the controller 61 executes the processing of S13 and thereafter again.

[Interface Lock Process]

Figure 5:
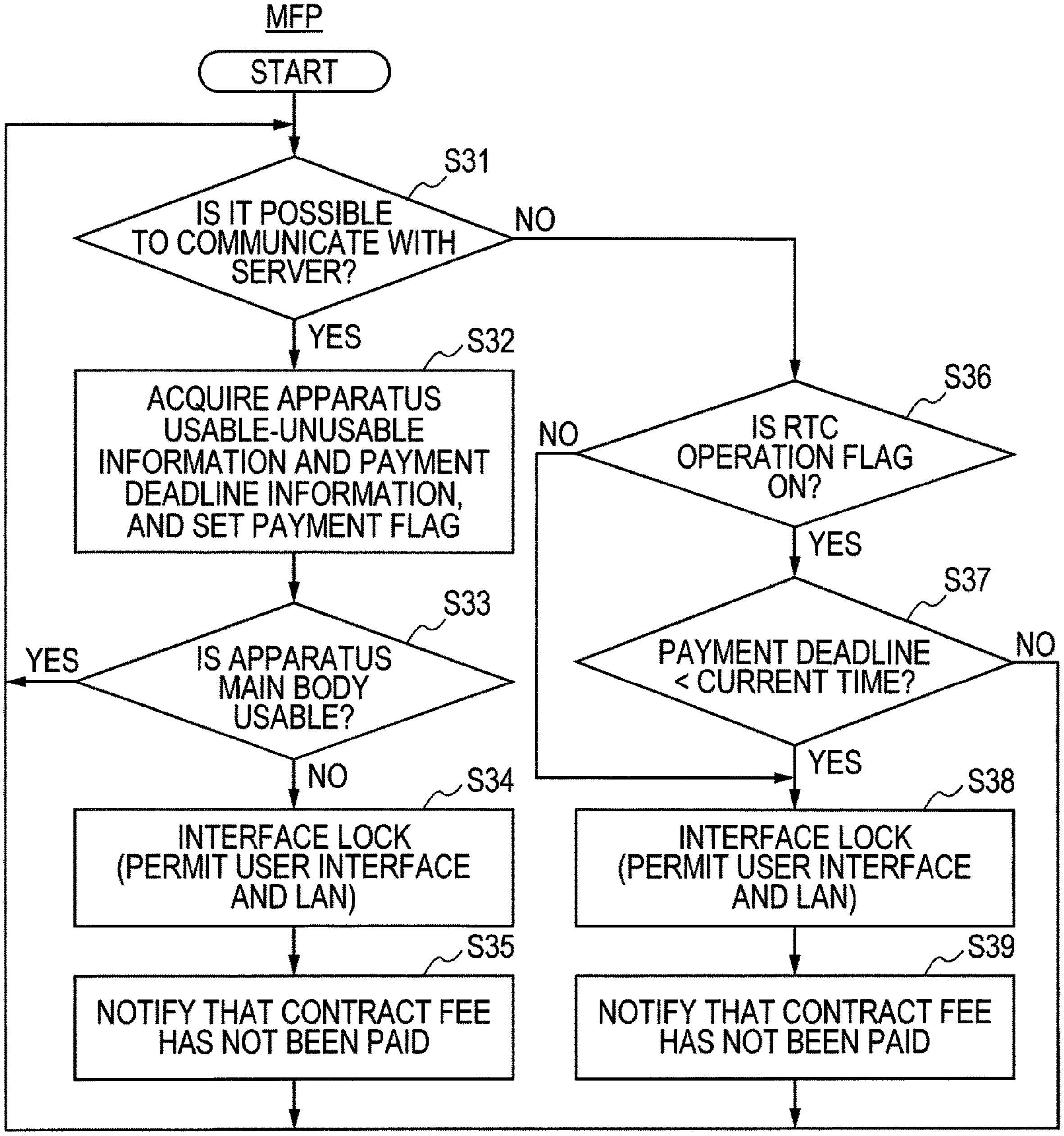
FIG. 5 is a flowchart showing an example of an interface lock process for disabling some functions executed by the controller of the multifunction peripheral.

Next, an interface lock process for disabling at least a part of the printing function, the scanner function, and the facsimile transmission and reception function executed by the controller 61 of the above-described MFP 1 will be described with reference to FIGS. 5 and 6. FIG. 5 is a flowchart showing an example of an interface lock process (I/F lock process) for disabling some functions executed by the controller 61 of the MFP 1. The program shown in the flowchart of FIG. 5 is stored in the apparatus memory 62 in advance. The controller 61 also starts the program of the interface lock process every several seconds to several minutes. FIG. 6 is a table for explaining an example of a use state in which some functions of the MFP 1 are unusable.

As shown in FIG. 5, in S31, the controller 61 tries to communicate with the server 8 via the communication interface 63. Then, the controller 61 determines whether it is possible to communicate with the server 8 via the communication interface 63. In response to determining that it is possible to communicate with the server 8 via the communication interface 63 (S31: YES), the controller 61 proceeds to S32.

In S32, the controller 61 transmits request information for requesting the apparatus usable-unusable information and the payment deadline information, together with the apparatus ID of the MFP 1, to the server 8 via the communication interface 63. Then, the controller 61 receives the apparatus usable-unusable information and the payment deadline information corresponding to the apparatus ID of the MFP 1 from the server 8 via the communication interface 63, and stores the received information in the deadline information storage portion of the area 628 of the apparatus memory 62.

When the apparatus usable-unusable information indicates that the contract fee of the apparatus contract of the MFP 1 has been paid and the apparatus main body 10 is continuously usable, the controller 61 reads a payment flag from the apparatus memory 62, sets the payment flag to ON, and stores the payment flag in the apparatus memory 62. When the apparatus usable-unusable information indicates that the contract fee of the apparatus contract of the MFP 1 has not been paid and the apparatus main body 10 is not continuously usable, the controller 61 reads the payment flag from the apparatus memory 62, sets the payment flag to OFF, and stores the payment flag in the apparatus memory 62. Thereafter, the controller 61 proceeds to S33.

In S33, the controller 61 determines whether the apparatus main body 10 of the MFP 1 is continuously usable based on the received apparatus usable-unusable information. Specifically, the controller 61 reads the payment flag from the apparatus memory 62, and determines whether the payment flag is set to ON. In response to determining that the apparatus main body 10 of the MFP 1 is continuously usable, that is, in response to determining that the payment flag is set to ON (S33: YES), the controller 61 executes the processing of S31 and thereafter again.

As a result, as indicated by "No. 6" and "No. 8" in FIG. 6, this corresponds to a case where "communication with server" is possible and "payment flag" is ON. Thus, the "interface lock determination" is usable. That is, the controller 61 enables the user to use (utilize) a plurality of functions including the printing function, the scanner function, and the facsimile transmission and reception function of the MFP 1.

In response to determining that the apparatus main body 10 of the MFP 1 is not continuously usable, that is, in response to determining that the payment flag is set to OFF (S33: NO), the controller 61 proceeds to S34.

In S34, the controller 61 disables the user from using (utilizing) a plurality of functions including the printing function, the scanner function, and the facsimile transmission and reception function. Alternatively, the controller 61 may disable the user from using some of the printing function, the scanner function, and the facsimile transmission and reception function. However, the controller 61 sets the display 64 as a user interface and the connection to the network NT via the communication interface 63 to be usable. Thereafter, the controller 61 proceeds to S35.

Thus, as indicated by "No. 5" and "No. 7" in FIG. 6, this corresponds to a case where "communication with server" is possible and "payment flag" is OFF. As a result, the "interface lock determination" is unusable. That is, the controller 61 disables the user from using a plurality of functions including the printing function, the scanner function, and the facsimile transmission and reception function of the MFP 1. Alternatively, the controller 61 may disable the user from using some of the printing function, the scanner function, and the facsimile transmission and reception function of the MFP 1.

In S35, the controller 61 displays a message indicating that the contract fee of the apparatus contract has not been paid on the display 64 of the MFP 1, thereby notifying the user that the contract fee of the apparatus contract has not been paid. Thereafter, the controller 61 executes the processing of S31 and thereafter again. Thereby, the controller 61 urges the user to pay the contract fee.

In S31, in response to determining that it is not possible to communicate with the server 8 via the communication interface 63 (S31: NO), the controller 61 proceeds to S36.

In S36, the controller 61 reads the RTC operation flag from the apparatus memory 62, and determines whether the RTC operation flag is set to ON. In response to determining that the RTC operation flag is set to OFF, that is, in response to determining that the current time information measured by the real-time clock 73 is not accurate time (S36: NO), the controller 61 proceeds to S38.

In S38, the controller 61 disables the user from using (utilizing) a plurality of functions including the printing function, the scanner function, and the facsimile transmission and reception function. Alternatively, the controller 61 may disable the user from using some of the printing function, the scanner function, and the facsimile transmission and reception function. However, the controller 61 sets the display 64 as a user interface and the connection to the network NT via the communication interface 63 to be usable. Thereafter, the controller 61 proceeds to S39 described later.

Thus, as indicated by "No. 1" and "No. 2" in FIG. 6, this corresponds to a case where "communication with server" is not possible and "RTC operation flag" is OFF. As a result, the "interface lock determination" is unusable. That is, the controller 61 disables the user from using a plurality of functions including the printing function, the scanner function, and the facsimile transmission and reception function of the MFP 1. Alternatively, the controller 61 may disable the user from using some of the printing function, the scanner function, and the facsimile transmission and reception function of the MFP 1.

In S36, in response to determining that the RTC operation flag is set to ON, that is, in response to determining that the current time information measured by the real-time clock 73 is accurate time (S36: YES), the controller 61 proceeds to S37.

In S37, the controller 61 reads the payment deadline of the contract fee of the apparatus contract from the deadline information storage portion of the area 628 of the apparatus memory 62. The controller 61 acquires the current time information from the real-time clock 73. Subsequently, the controller 61 determines whether the current time is past the payment deadline of the contract fee of the apparatus contract. In response to determining that the current time is not past the payment deadline of the contract fee of the apparatus contract (S37: NO), the controller 61 executes the processing of S31 and thereafter again. In a case where the current time is not past the payment deadline of the contract fee of the apparatus contract, the payment flag stored in the apparatus memory 62 is set to ON (see S32).

As a result, as indicated by "No. 4" in FIG. 6, this corresponds to a case where "communication with server" is not possible, the "RTC operation flag" is ON, and the "payment flag" is ON. Thus, the "interface lock determination" is usable. That is, the controller 61 enables the user to use (utilize) a plurality of functions including the printing function, the scanner function, and the facsimile transmission and reception function of the MFP 1.

Thus, even during the off-line in which the communication with the external server 8 is disconnected, until the payment deadline of the contract fee passes, a plurality of functions including the printing function, the scanner function, and the facsimile transmission and reception function of the MFP 1 are usable.

In S37, in response to determining that the current time is past the payment deadline of the contract fee of the apparatus contract (S37: YES), the controller 61 proceeds to S38. In a case where the current time is past the payment deadline of the contract fee of the apparatus contract, the payment flag stored in the apparatus memory 62 is set to OFF (see S32). Thus, even during the off-line in which the communication with the external server 8 is disconnected, when the current time of the real-time clock 73 is past the payment deadline of the contract fee (S37: YES), the controller 61 proceeds to S38.

In S38, the controller 61 disables the user from using (utilizing) a plurality of functions including the printing function, the scanner function, and the facsimile transmission and reception function. However, the controller 61 sets the display 64 as a user interface and the connection to the network NT via the communication interface 63 to be usable. Thereafter, the controller 61 proceeds to S39 described later.

Thus, as shown in "No. 3" of FIG. 6, this corresponds to a case where "communication with server" is not possible, "RTC operation flag" is ON, and "payment flag" is OFF. As a result, the "interface lock determination" is unusable. That is, the controller 61 disables the user from using a plurality of functions including the printing function, the scanner function, and the facsimile transmission and reception function of the MFP 1. Alternatively, the controller 61 may disable the user from using some of the printing function, the scanner function, and the facsimile transmission and reception function of the MFP 1.

In this way, when the payment deadline of the contract fee passes during the offline in which the communication with the external server 8 is disconnected, the controller 61 restricts the use of a plurality of functions including the printing function, the scanner function, and the facsimile transmission and reception function. Further, when the real-time clock 73 is improperly initialized, the controller 61 restricts the use of a plurality of functions including the printing function, the scanner function, and the facsimile transmission and reception function. Thus, the MFP 1 easily determines unauthorized use even in the offline state where communication with the external server 8 is disconnected.

In S39, the controller 61 displays a message indicating that the contract fee of the apparatus contract has not been paid on the display 64 of the MFP 1, thereby notifying the user that the contract fee of the apparatus contract has not been paid. Thereafter, the controller 61 executes the processing of S31 and thereafter again. Thereby, the controller 61 urges the user to pay the contract fee.

According to the above-described embodiment, in a case where communication with the server 8 is not possible, when it is determined that the real-time clock 73 is operating, the time information is acquired from the real-time clock 73. When the time information acquired from the real-time clock 73 is past the payment deadline of the contract fee, at least a part of functions usable by the image forming apparatus is made unusable. This makes it possible to restrict the functions that are usable by the MFP 1 when the payment deadline of the contract fee expires during the offline state where communication with the external server is disconnected. Thus, it is possible to provide the MFP 1 configured to determine an unauthorized use even in an offline state where communication with the external server 8 is disconnected.

According to the above-described embodiment, when the time information acquired from the real-time clock 73 is not past the payment deadline of the contract fee, the functions of the MFP 1 are made usable. Thus, even during the off-line in which the communication with the external server 8 is disconnected, the functions of the MFP 1 are usable until the payment deadline of the contract fee passes.

According to the above-described embodiment, when the real-time clock 73 is initialized, it cannot be determined whether the deadline indicated by the particular deadline information has passed, and thus the controller 61 executes the lock process. This makes it possible to restrict the usable functions of the MFP 1 when the real-time clock 73 is improperly initialized.

According to the above-described embodiment, the controller 61 sets the RTC operation flag when the time information is acquired from the server 8 and the time information of the real-time clock 73 is updated. Thus, when the real-time clock 73 is improperly initialized in a state where communication with the server 8 is not possible, the controller 61 refers to the RTC operation flag to determine whether the time information of the real-time clock 73 is updated by communicating with the server 8.

According to the above-described embodiment, by enabling the communication function with the server 8, when the user pays the contract fee and connects the MFP 1 to the network, the controller 61 communicates with the server 8. As a result, the controller 61 communicates with the server 8 and sets each function that has become unusable to be usable. Further, by making the user interface usable, the controller 61 notifies the user about the unusable function and various kinds of information via the user interface.

According to the above-described embodiment, the user recognizes that the cause of the unusable function of the MFP 1 is the non-payment of the contract fee. Thus, the controller 61 urges the user to pay the contract fee.

According to the above-described embodiment, after the contract information is acquired from the server 8, the user is restricted from manually changing the time of the real-time clock 73. This further improves the reliability of the real-time clock 73.

[Modification 1]

The image forming apparatus of the present disclosure is not limited to the MFP 1. The image forming apparatus may be an apparatus dedicated to a printing function, such as a laser printer and an inkjet printer, for example.

[Modification 2]

The drum cartridge 20 may include a photosensitive drum, a cartridge housing, the drum memory 22, a charger, and a development roller. The cartridge housing is provided with the photosensitive drum, the drum memory 22, the charger, and the development roller. The toner cartridge 4 includes a cartridge housing and the toner memory 42, but does not include a development roller. The cartridge housing contains toner. The outer circumferential surface of the development roller is in contact with the outer circumferential surface of the photosensitive drum inside the drum cartridge 20.

[Modification 3]

The toner cartridge 4 may be constituted by two cartridges (not shown). A first cartridge of the two cartridges constituting the toner cartridge 4 includes a development roller. A second cartridge of the two cartridges constituting the toner cartridge 4 includes a cartridge housing and the toner memory 42. The cartridge housing contains toner.

[Modification 4]

The MFP 1 may include a single cartridge (not shown) instead of the drum cartridge 20 and the toner cartridge 4. The single cartridge includes a photosensitive drum, a cartridge housing, a memory, a charger, and a development roller. The outer circumferential surface of the development roller is in contact with the outer circumferential surface of the photosensitive drum inside the single cartridge. The cartridge housing of the single cartridge contains toner.

[Modification 5]

In the MFP 1, the drum cartridge 20 and the toner cartridge 4 may be independently attachable to and detachable from the apparatus main body 10.

[Modification 6]

The print engine 66 of the MFP 1 may be an inkjet printer. In a case where the print engine 66 is an inkjet printer, an ink cartridge is attached to the apparatus main body 10 of the MFP 1 instead of the drum cartridge 20 and the toner cartridge 4. The number of ink cartridges attached to the MFP 1 is not particularly limited. For example, the MFP 1 may be provided with a total of four ink cartridges corresponding to four colors of cyan, magenta, yellow, and black, respectively, or may be provided with one ink cartridge corresponding to black color.

The ink cartridge includes a built-in ink memory. The ink memory stores, for example, an ink ID, ink type information, an ink remaining amount, a new product flag, and order information. The ink ID is information similar to the toner ID. The ink type information is information similar to the second type information.

In a case where the print engine 66 is an inkjet printer, the flow of the process of FIGS. 4 and 5 is similar. Specifically, in a case where the print engine 66 is an inkjet printer, the "toner cartridge 4" and the "toner memory 42" in the description of the above-described embodiment may be replaced with an ink cartridge and an ink memory, respectively. Further, the "toner ID", the "second type information", and the "toner remaining amount information" may be replaced with the ink ID, the ink type information, and the ink remaining amount information, respectively. In a case where the print engine 66 is an inkjet printer, the effects similar to those of the MFP 1 of the embodiment are obtained.

[Modification 7]

In S34 and S38, the controller 61 may set the connection to the network NT via the communication interface 63 to be usable, and may set the display 64 as the user interface to be unusable. In this case, when the user pays the contract fee and connects the MFP 1 to the network NT, the controller 61 communicates with the server 8 and sets each function that has become unusable to be usable.

In S34 and S38, the controller 61 may set the display 64 as the user interface to be usable, and may set the connection to the network NT via the communication interface 63 to be unusable. In this case, the controller 61 notifies the user about the functions that have become unusable and various kinds of information via the display 64.

[Example of Implementation by Software]

The functions of the MFP 1 (hereinafter referred to as "apparatus") may be implemented by a program for causing a computer to function as the MFP 1, that is, the program for causing the computer to function as the controller 61 of the MFP 1.

In this case, the MFP 1 includes a computer including at least one control device (for example, a processor) and at least one storage device (for example, a memory) as hardware for executing the program. Each function described in the above embodiment is realized by executing the program by the control device and the storage device.

The program may be recorded in one or more non-transitory computer-readable storage medium. This storage medium may be included in the MFP 1 or may not be included in the MFP 1. In the latter case, the program may be supplied to the MFP 1 via any wired or wireless transmission medium.

A part or all of the functions of the controller 61 may be realized by a logic circuit. For example, an integrated circuit in which a logic circuit functioning as each of the above-described control blocks is formed is also included in the scope of the present disclosure.

While the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the present disclosure, and not limiting the present disclosure. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided as appropriate.

What is claimed is:

1. An image forming apparatus comprising:

an apparatus main body connected to an external power source via a power supply plug;

a communication interface;

a memory;

a capacitor configured to be charged by power supplied from the external power source via the power supply plug;

a real-time clock configured to be driven by power supplied from the capacitor after power supplied from the external power source is stopped, the real-time clock configured to be initialized in a case where the power supply plug is removed from the external power source and power supplied from the external power source to the apparatus main body is stopped, then the power supplied from the capacitor to the real-time clock is stopped, and then power supplied from the external power source to the apparatus main body via the power supply plug is resumed; and a controller configured to perform:

acquiring payment deadline information from a server via the communication interface, and storing the payment deadline information in the memory, the payment deadline information including a payment deadline of a contract fee for the image forming apparatus that is usable by setting a contract;

determining whether communication with the server is possible;

in response to determining that communication with the server is not possible, determining whether the real-time clock is operating;

in response to determining that the real-time clock is operating, acquiring time information from the real-time clock and determining whether the time information is past the payment deadline by referring to the payment deadline information stored in the memory and the time information acquired from the real-time clock; and in response to determining that the time information is past the payment deadline, disabling at least part of functions of the image forming apparatus.

2. The image forming apparatus according to claim 1, wherein the controller is configured to:

in response to determining that the time information is not past the payment deadline, enable the functions of the image forming apparatus.

3. The image forming apparatus according to claim 1, wherein the determining whether the real-time clock is operating includes determining whether the real-time clock has been initialized; and wherein the controller is configured to:

in response to determining that the real-time clock has been initialized, disable the at least part of functions of the image forming apparatus.

4. The image forming apparatus according to claim 3, wherein the controller is configured to:

acquire server time information by communicating with the server;

update the time information of the real-time clock with the server time information; and set an RTC operation flag that indicates that the time information of the real-time clock has been updated.

5. The image forming apparatus according to claim 3, wherein the controller is configured to:

in response to determining that the real-time clock has been initialized, set an RTC operation flag to OFF, the RTC operation flag being a flag indicating whether the time information of the real-time clock is accurate time;

in response to acquiring server time information by communicating with the server and updating the time information of the real-time clock with the server time information, set the RTC operation flag to ON;

in response to determining that the RTC operation flag is ON, determine whether to enable the functions of the image forming apparatus or disable the at least part of functions of the image forming apparatus, based on the payment deadline information stored in the memory and the time information acquired from the real-time clock; and in response to determining that the RTC operation flag is OFF, disable the at least part of functions of the image forming apparatus.

6. The image forming apparatus according to claim 1, further comprising a user interface, wherein the controller is configured to:

when disabling the at least part of functions of the image forming apparatus, enable at least the user interface or a communication function with the server.

7. The image forming apparatus according to claim 6, wherein the user interface includes a display and an operation interface; and wherein the controller is configured to:

when disabling the at least part of functions of the image forming apparatus, control the display to display that the contract fee has not been paid.

8. The image forming apparatus according to claim 1, wherein the server stores contract information for the image forming apparatus that is usable by setting the contract; and wherein the controller is configured to:

acquire the contract information by communicating with the server; and after acquiring the contract information, disable manually changing the time information of the real-time clock.

9. The image forming apparatus according to claim 1, wherein the controller is configured to:

in response to determining that the real-time clock is not operating, disable the at least part of functions of the image forming apparatus.

10. A control method of an image forming apparatus comprising an apparatus main body connected to an external power source via a power supply plug, a communication interface, a memory, a capacitor configured to be charged by power supplied from the external power source via the power supply plug, and a real-time clock configured to be driven by power supplied from the capacitor after power supplied from the external power source is stopped, the control method comprising:

initializing the real-time clock in a case where the power supply plug is removed from the external power source and power supplied from the external power source to the apparatus main body is stopped, then the power supplied from the capacitor to the real-time clock is stopped, and then power supplied from the external power source to the apparatus main body via the power supply plug is resumed;

acquiring payment deadline information from a server via the communication interface, and storing the payment deadline information in the memory, the payment deadline information including a payment deadline of a contract fee for the image forming apparatus that is usable by setting a contract;

determining whether communication with the server is possible;

in response to determining that communication with the server is not possible, determining whether the real-time clock is operating;

in response to determining that the real-time clock is operating, acquiring time information from the real-time clock and determining whether the time information is past the payment deadline by referring to the payment deadline information stored in the memory and the time information acquired from the real-time clock; and in response to determining that the time information is past the payment deadline, disabling at least part of functions of the image forming apparatus.

11. The control method according to claim 10, further comprising:

in response to determining that the time information is not past the payment deadline, enabling the functions of the image forming apparatus.

12. The control method according to claim 10, wherein the determining whether the real-time clock is operating includes determining whether the real-time clock has been initialized; and wherein the control method further comprises:

in response to determining that the real-time clock has been initialized, disabling the at least part of functions of the image forming apparatus.

13. The control method according to claim 12, wherein the control method further comprises:

acquiring server time information by communicating with the server;

updating the time information of the real-time clock with the server time information; and setting an RTC operation flag that indicates that the time information of the real-time clock has been updated.

14. The control method according to claim 12, wherein the control method further comprises:

in response to determining that the real-time clock has been initialized, setting an RTC operation flag to OFF, the RTC operation flag being a flag indicating whether the time information of the real-time clock is accurate time;

in response to acquiring server time information by communicating with the server and updating the time information of the real-time clock with the server time information, setting the RTC operation flag to ON;

in response to determining that the RTC operation flag is ON, determining whether to enable the functions of the image forming apparatus or disable the at least part of functions of the image forming apparatus, based on the payment deadline information stored in the memory and the time information acquired from the real-time clock; and in response to determining that the RTC operation flag is OFF, disabling the at least part of functions of the image forming apparatus.

15. The control method according to claim 10, wherein the image forming apparatus further comprising a user interface; and wherein the control method further comprises:

when disabling the at least part of functions of the image forming apparatus, enabling at least the user interface or a communication function with the server.

16. The control method according to claim 15, wherein the user interface includes a display and an operation interface; and wherein the control method further comprises:

when disabling the at least part of functions of the image forming apparatus, controlling the display to display that the contract fee has not been paid.

17. The control method according to claim 10, wherein the server stores contract information for the image forming apparatus that is usable by setting the contract; and wherein the control method further comprises:

acquiring the contract information by communicating with the server; and after acquiring the contract information, disabling manually changing the time information of the real-time clock.

18. The control method according to claim 10, wherein the control method further comprises:

in response to determining that the real-time clock is not operating, disabling the at least part of functions of the image forming apparatus.

* * * * *